P. MacGAHAN.
ELECTRICAL PROTECTIVE DEVICE.
APPLICATION FILED AUG. 9, 1915.
1,224,400.
Patented May 1, 1917.
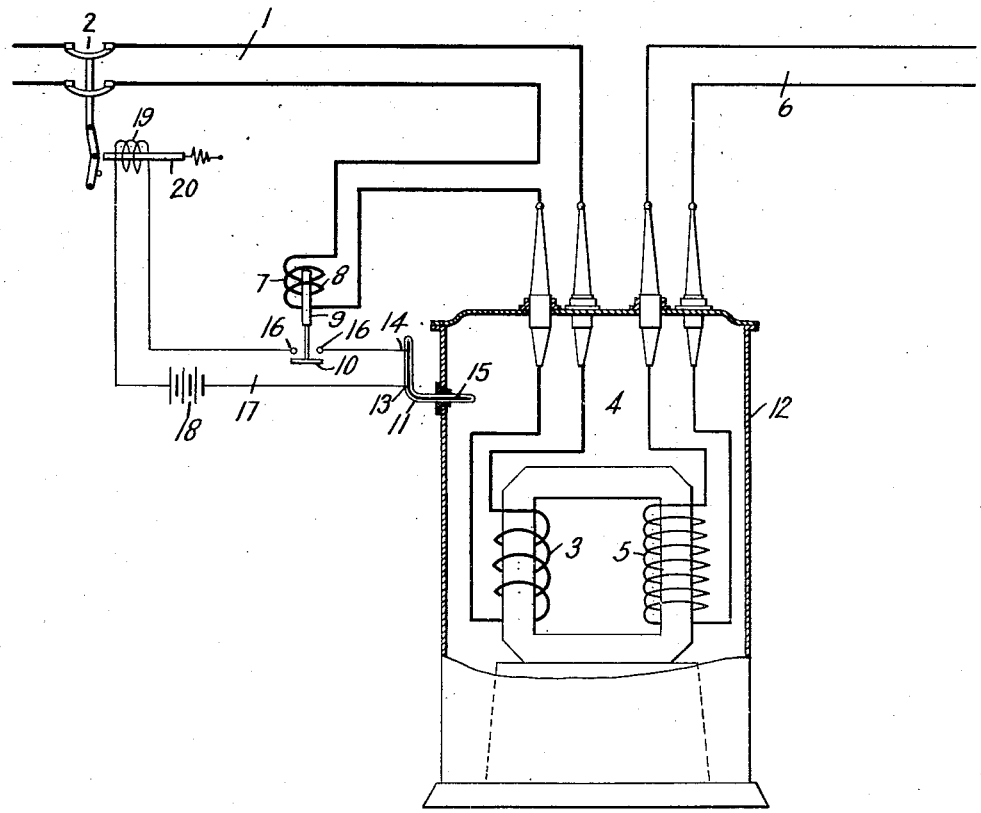
WITNESSES:
INVENTOR
Paul MacGahan
BY
ATTORNEY

UNITED STATES PATENT OFFICE.

PAUL MacGAHAN, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL PROTECTIVE DEVICE.

1,224,400.　　　Specification of Letters Patent.　　Patented May 1, 1917.

Application filed August 9, 1915. Serial No. 44,440.

*To all whom it may concern:*

Be it known that I, PAUL MACGAHAN, a citizen of the United States, and a resident of Pittsburgh, in the county of Allegheny and State of Pennsylvania, have invented a new and useful Improvement in Electrical Protective Devices, of which the following is a specification.

My invention relates to electrical protective devices and particularly to means for protecting electrical translating devices in accordance with the temperature and the load traversing such devices.

The object of my invention is to provide an electrical protective device that is actuated only when the load traversing a translating device is of a predetermined value at substantially the same instant that the temperature of said device is of a predetermined value.

Heretofore, time-limit relays have been provided for the purpose of tripping circuit interrupters upon the occurrence of a persistent overload and for preventing the tripping of the same upon the occurrence of a momentary overload.

Since the load traversing some devices is not detrimental because of their superior ventilating, radiating and heat-storing properties, it has been suggested that it is only necessary to disconnect such devices from the circuit when their temperature reaches a destructive value. However, since the excessive heating of electrical translating devices is dependent upon the load, I provide a system comprising an overload relay and a temperature relay having their contact members so connected in series relation that the translating device is disconnected from the circuit only when the load traversing the circuit is of a predetermined value, and the temperature of the translating device, to which the relays are connected, is also of a predetermined value. Thus, if the load is of a predetermined value and the temperature is relatively low, the translating device will not be disconnected from the circuit and if the temperature is of a predetermined value and the load is so decreased in value as to reduce the temperature to safe values, the device will not be disconnected from the circuit. Hence, under no conditions is the circuit unnecessarily interrupted.

The single figure of the accompanying drawing is a diagrammatic illustration of an electrical translating device that is protected by a system embodying my invention.

An electrical circuit 1 is provided with a circuit interrupter 2 and is operatively connected to the primary winding 3 of a transformer 4, the secondary winding 5 of which is connected to an electrical circuit 6. A relay 7, comprising a winding 8, a movable core member 9 and a movable contact member 10, is operatively connected to the circuit 1 and is so adjusted as to be actuated when the load traversing the circuit 1 reaches a predetermined value. A thermometer 11 is inserted in the tank 12 of the transformer 4 and is provided with two contact members 13 and 14 that are adapted to be bridged by the mercury 15 of the thermometer when the oil in the tank 12 reaches a predetermined temperature. The thermometer 11 may be supplanted by any other form of contact making temperature responsive device such as a thermostat or a contact making voltmeter actuated by thermocouples.

The relay 7 is provided with two stationary contact members 16 that are adapted to be engaged by the movable contact member 10. The contact members 14, 15 and 16 are connected in a circuit 17 that comprises a source of electromotive force 18 and the winding 19 of a tripping electromagnet 20.

When the relay 7 is sufficiently energized to operate, and the thermometer 11 is subjected to such temperatures that the contact members 13 and 14 are bridged by the mercury 15, current will traverse the winding 19 to trip the circuit interrupter. The circuit interrupter 2 is tripped only when the overload on the transformer 4 occurs at substantially the same instant that the temperature of the transformer is of a predetermined value. It will be understood that the thermometer 11 is so disposed with respect to the transformer 4 that the mercury 14 rises to such height as to be an indication of the temperature of the hottest portion of the transformer.

While I have illustrated my invention with respect to a transformer and a circuit interrupter for protecting the same, it will be understood that my device may be utilized with other translating devices and with other protective means. It will be further understood that my invention is not limited to the particular type of overload and temperature relay, as many modifications may be used without departing from the spirit and scope of the invention as set forth in the appended claims.

I claim as my invention:

1. In an electric circuit, the combination with a translating device and an electrically actuated device, of an overload relay and a temperature relay having their contacts so connected in series with the electrically actuated device that said device operates only when the overload on, and the temperature of, the translating device both reach predetermined values.

2. In an electric circuit, the combination with a translating device and an electro-responsive device, of an overload relay, and a temperature relay responsive to the temperature of the translating device, said relays being adapted to so control the circuit of the electro-responsive device that the overload on, and the temperature of, the translating device must be of predetermined values before the electro-responsive device is actuated.

3. In an electric circuit, the combination with a translating device and an electro-responsive device, of a current relay, and a temperature relay responsive to the temperature of the translating device, said relays being adapted to control the circuit of the electro-responsive device only when they operate simultaneously.

4. In an electric circuit, the combination with a translating device and an electro-responsive device, of means for controlling the circuit of the electro-responsive device only when a predetermined current traverses the translating device and when the temperature of the translating device is a predetermined value.

5. In an electric circuit, the combination with a translating device and means for controlling the circuit thereof, of means responsive to the combined effect of the temperature of, and the load traversing, the translating device adapted to control the operation of the said means for controlling the circuit of the translating device under predetermined conditions.

6. In an electric circuit, the combination with a translating device and a circuit interrupter therefor, of means operatively connected to the translating device whereby the circuit interrupter is tripped only when the current traversing the translating device and the temperature thereof are of predetermined values.

7. In an electric circuit, the combination with a transformer and a circuit interrupter therefor, of tripping means for the circuit interrupter, and means responsive to the load on, and the temperature of, the transformer for so controlling the tripping means that the interrupter is tripped when the combined effect of the load traversing the transformer and the temperature thereof is a predetermined value.

8. The combination with a translating device and a protective device therefor, of means for rendering the protective device effective when the combined effect of the load on, and the temperature of, the translating device is a predetermined value.

9. The combination with a translating device and an electrically actuated device, of an overload relay, and a relay responsive to the temperature of the translating device, said relays having their contacts so connected in series with the electrically actuated device that the said device operates only when the combined effect of the overload on, and the temperature of, the translating device reaches a predetermined value.

10. A relay system for a translating device comprising means responsive only when the combined effect of the temperature of, and the load on, the translating device is a predetermined value.

11. The combination with a translating device, of means operatively connected to the translating device and responsive only when the combined effect of the temperature of, and the load on, the translating device exceeds a predetermined value.

12. The combination with a translating device, of means responsive to the combined effect of the temperature of, and the load traversing, the translating device adapted to be rendered operative under predetermined conditions.

13. The combination with a translating device, of means responsive to the temperature of, and the load traversing, the translating device adapted to be rendered operative when a predetermined load traverses the translating device at the same time that the translating device has a predetermined temperature.

In testimony whereof, I have hereunto subscribed my name this 31st day of July 1915.

PAUL MacGAHAN.